H. H. MERRIMAN.
CULTIVATOR.
APPLICATION FILED JULY 24, 1920.

1,402,880.

Patented Jan. 10, 1922.
2 SHEETS—SHEET 1.

Inventor
Henry H. Merriman
By Whittemore Hulbert & Whittemore,
Attorneys

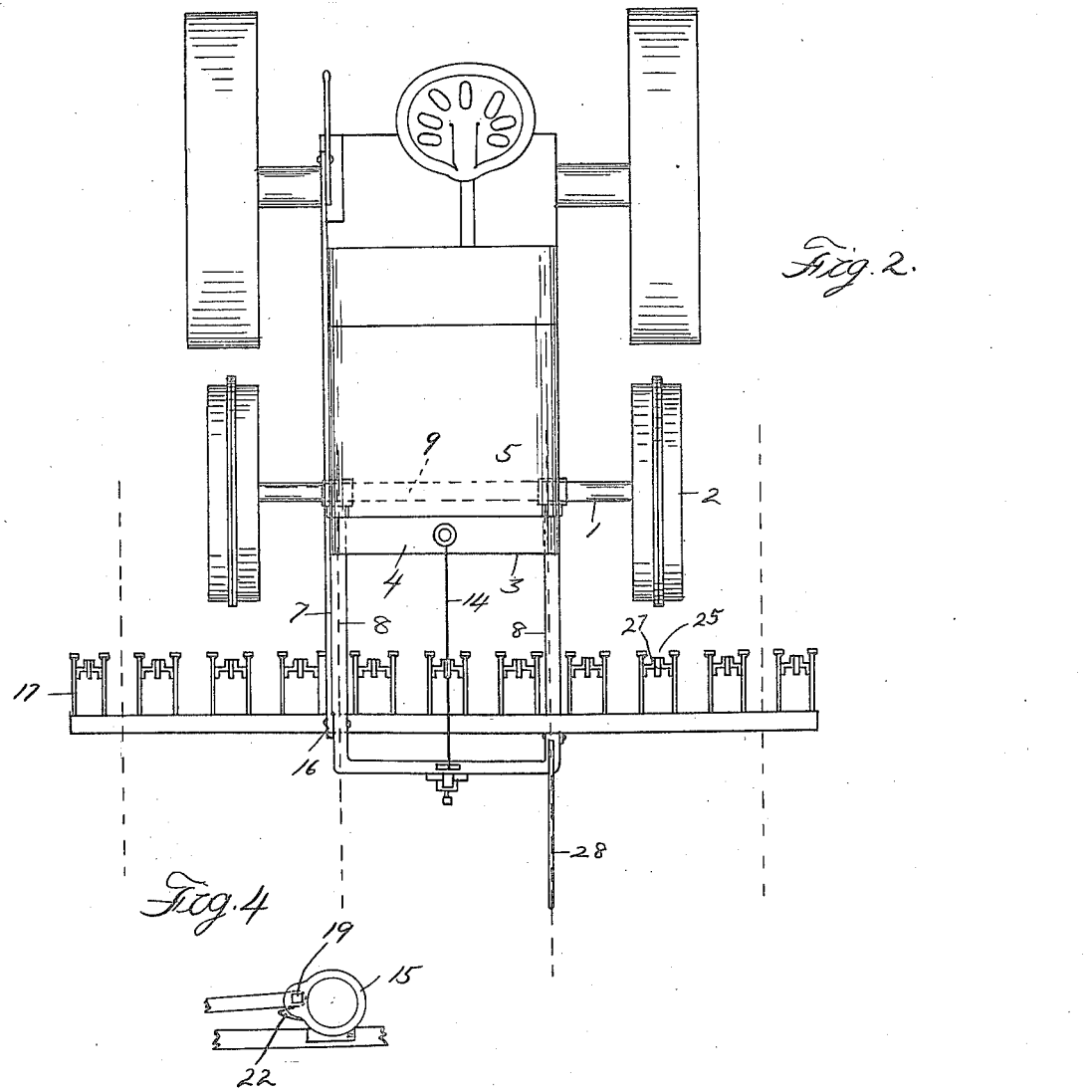

UNITED STATES PATENT OFFICE.

HENRY H. MERRIMAN, OF DECKERVILLE, MICHIGAN.

CULTIVATOR.

1,402,880.  Specification of Letters Patent.  Patented Jan. 10, 1922.

Application filed July 24, 1920. Serial No. 398,605.

*To all whom it may concern:*

Be it known that I, HENRY H. MERRIMAN, a citizen of the United States of America, residing at Deckerville, in the county of Sanilac and State of Michigan, have invented certain new and useful Improvements in Cultivators, of which the following is a specification, reference being had therein to the accompanying drawings.

The invention relates to agricultural implements and is particularly applicable to cultivators. One of the objects of the invention is the provision of a simplified construction which may be readily attached to a tractor. Another object is to pivot the frame of the implement upon the front axle of the tractor and to provide means for preventing the working tool of the implement from lowering beyond a predetermined point. A further object is the provision of a sight to facilitate steering of the tractor. The invention has for still further objects the novel features of construction, and combinations of parts, as more fully hereinafter set forth.

In the drawings:

Figure 1 is a side elevation, with parts broken away, of a construction embodying my invention;

Figures 3 and 4 are detail views.

The tractor has the front axle 1 upon which are mounted the steering wheels 2. 3 is a radiator having the air cooling portion 4 and the cap portion 5 with the filler neck.

Figure 2:
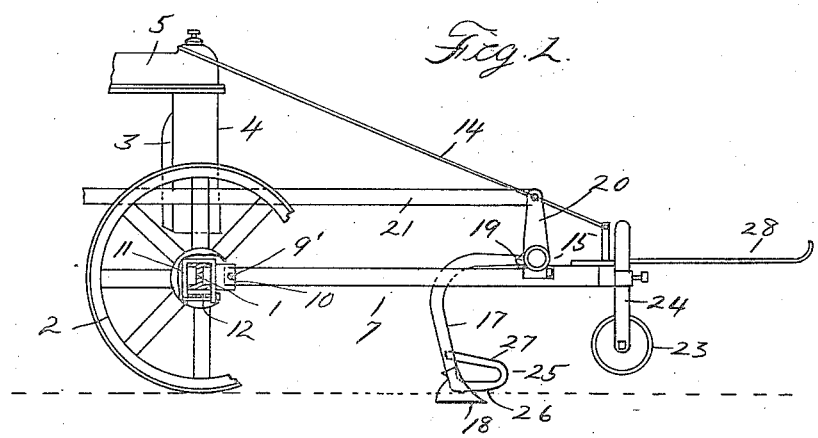
Figure 2 is a top plan view thereof.
Figure 3:
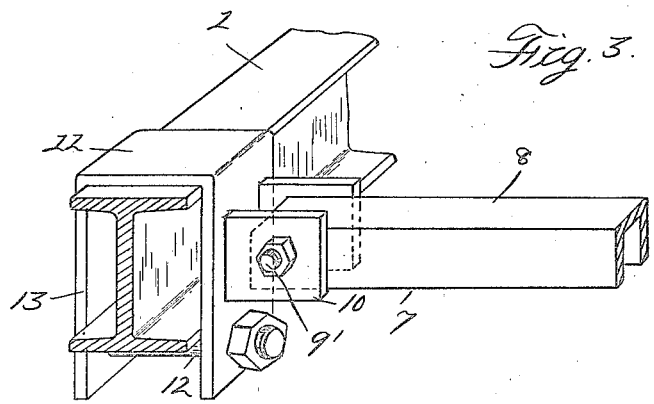

7 is the frame of the agricultural implement, which in the present instance is a cultivator. This frame extends forwardly of the front axle 1 and comprises the side sills 8 and the cross bar 9 at the front end of the side sills. The side sills are pivotally connected to the front axle and, as shown in Figure 3 particularly, 9 is the pivot which extends through each side sill and through the parallel ears or projections 10 of the U-shaped clip 11, which embraces the front axle and is clamped thereto by means of the bolt 12 which passes through the lower ends of the sides 13 of the clip and beneath the front axle. 14 is a flexible connection secured to the middle of the cross bar 9 and around the filler neck 6 of the radiator for maintaining the front end of the frame 7 at approximately the same height from the ground as the axle 1 of the tractor.

15 is a draw bar extending transversely of the frame 7 and pivotally mounted upon the side sills 8 as at 16. 17 are arms carrying the cultivating tools 18 at their lower ends, these arms being pivotally connected to the draw bar 15 as at 19 and extending rearwardly and then curving downwardly and forwardly to their points of connection with their respective cultivating tools. To raise the cultivating tools from engagement with the ground, the draw bar 15 has the upwardly extending arm 20 rigidly secured thereto, which arm is pivotally connected to the bar 21 extending rearwardly to a position to be actuated by the driver of the tractor. Stops 22 are located upon the draw bar 15 and beneath the rearwardly extending portions of the arms 17 so that upon forward rotation of the draw bar about its pivots these stops will engage the arms to raise the same. When the cultivating tools are in operation, the stops are spaced beneath the rearwardly extending portions of the arms sufficiently to permit of the cultivating tools engaging in the ground.

In order to prevent the cultivating tools 18 from digging into the ground to a too great an extent when the steering wheels 2 of the tractor are lowered relative to the driving wheels thereof, as when the steering wheels are in a hollow or ditch, there is a wheel 23 carried upon the upright standard 24, which is vertically adjustably mounted at the middle of the cross bar 9 of the frame 7. This wheel is normally raised above the ground, but when the steering wheels of the tractor drop into a depression, the wheel will engage the ground and prevent the cultivating tools from digging too deeply.

25 are the guards for normally controlling the depth to which the cultivating tools 18 extend into the ground. These guards are secured at the sides of the cultivating tools and extend forwardly thereof, with their lower faces 26 raised a predetermined distance above the bottoms of the cultivating tools to which it is desired that the tools extend into the ground. The forward ends of these guards are curved forwardly and upwardly and terminate in return bent portions 27 which are secured at their rear ends to the arms 17. With this type of control, the depths to which the cultivating tools extend into the ground are more accurately governed.

For the purpose of facilitating the steering of the tractor in following the rows which are being cultivated, there is a sight 28 comprising a forwardly extending bar which is rigidly secured at its rear end to the frame 7. The forward end of this sight is a substantial distance in advance of the tractor so that the deviation of the tractor from a straight line is greatly multiplied when using the forward end of the sight in steering.

What I claim as my invention is:

1. The combination with the front axle of a tractor, of a frame extending forwardly thereof and pivotally secured thereto, and means secured to the radiator of the tractor and to said frame near its forward end for normally supporting the same.

2. The combination with the front axle of a tractor, of a frame extending forwardly thereof and pivotally connected thereto, a flexible connection between the forward end of said frame and the radiator of the tractor for normally supporting the former, and means at the forward end of said frame normally out of engagement with the ground and adapted to engage the same upon abnormal lowering of the forward end of said frame relative to the ground.

3. The combination with the front axle of a tractor, of a frame extending forwardly thereof and pivotally connected thereto at its rear end, a flexible connection between the forward end of said frame and the radiator of the tractor for normally supporting the forward end of said frame, and a wheel vertically adjustably mounted upon said frame near its forward end, normally out of engagement with the ground and adapted to engage the ground upon abnormal lowering of the forward end of said frame.

4. The combination with the front axle of a tractor, of a frame extending forwardly thereof and secured thereto, a draw bar extending transversely of said frame and pivotally mounted thereon, an arm mounted upon said draw bar a ground working implement upon said arm and means connected to said draw bar for rotating the same to raise said arm and implement.

5. The combination with the front axle of a tractor, of a cultivator frame extending forwardly thereof and pivotally secured thereto at its rear end, a draw bar extending transversely of said frame and pivotally mounted thereon, cultivating tools pivotally secured to said draw bar, stops upon said draw bar adapted to engage the connections between said tools and draw bar upon forward rotation of the latter, and means for rotating said draw bar in a forward direction.

6. The combination with the front axle of a tractor, of a frame extending forwardly thereof and secured thereto, a draw bar extending transversely of said frame and pivotally mounted thereon, arms pivotally connected to said draw bar and extending rearwardly and downwardly, work tools upon the lower ends of said arms, stops upon said draw bar and beneath said arms, said stops adapted to engage said arms upon forward rotation of said draw bar, and means for rotating said draw bar in said direction.

In testimony whereof I affix my signature.

HENRY H. MERRIMAN.